US012063407B2

(12) United States Patent
Kirst et al.

(10) Patent No.: US 12,063,407 B2
(45) Date of Patent: Aug. 13, 2024

(54) SYSTEMS, METHODS, AND DEVICES FOR BUFFER HANDSHAKE IN VIDEO STREAMING

(71) Applicant: Cypress Semiconductor Corporation, San Jose, CA (US)

(72) Inventors: Peter Kirst, Gilching (DE); Andreas Torno, Eching (DE); Roland Richter, Puchheim (DE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/324,905

(22) Filed: May 19, 2021

(65) Prior Publication Data

US 2022/0377402 A1 Nov. 24, 2022

(51) Int. Cl.
*H04N 21/433* (2011.01)
*H04N 21/426* (2011.01)
*H04N 21/43* (2011.01)

(52) U.S. Cl.
CPC . *H04N 21/42653* (2013.01); *H04N 21/42607* (2013.01); *H04N 21/42692* (2013.01); *H04N 21/4307* (2013.01); *H04N 21/4331* (2013.01)

(58) Field of Classification Search
CPC ....... H04N 21/42653; H04N 21/42607; H04N 21/42692; H04N 21/4307
See application file for complete search history.

(56) References Cited

U.S. PATENT DOCUMENTS

| 5,517,253 | A | * | 5/1996 | De Lange | G09G 5/39 348/584 |
| 5,936,677 | A | * | 8/1999 | Fries | H04N 21/4316 348/588 |
| 6,717,989 | B1 | * | 4/2004 | Simsic | H04N 21/4302 375/240 |
| 2007/0040842 | A1 | * | 2/2007 | Ishihara | G09G 5/39 345/545 |
| 2009/0132782 | A1 | * | 5/2009 | Jeffrey | H04N 19/423 711/E12.001 |
| 2012/0075334 | A1 | * | 3/2012 | Pourbigharaz | G06F 3/1438 345/619 |
| 2012/0207208 | A1 | * | 8/2012 | Wyatt | H04N 21/44209 348/54 |
| 2016/0173847 | A1 | * | 6/2016 | Staudenmaier | H04N 5/77 386/207 |
| 2017/0116966 | A1 | * | 4/2017 | Brabender | H04N 19/423 |

* cited by examiner

*Primary Examiner* — Jefferey F Harold
*Assistant Examiner* — Alexander Boyd

(57) ABSTRACT

Systems, methods, and devices implement video streaming. Methods include receiving video data from a video source, the video data comprising at least one video frame, and determining a plurality of store parameters associated with a store operation and a plurality of fetch parameters associated with a fetch operation for a portion of the video data, wherein the plurality of store parameters and the plurality of fetch parameters identify whether a fetch unit or a store unit should be stalled. Methods also include implementing a store operation in a buffer for a designated number of lines of the video data based on the plurality of store parameters. Methods additionally include implementing a fetch operation from the buffer for the designated number of lines of the video data based on the plurality of fetch parameters.

20 Claims, 7 Drawing Sheets

SYSTEMS, METHODS, AND DEVICES FOR BUFFER HANDSHAKE IN VIDEO STREAMING

TECHNICAL FIELD

This disclosure generally relates to video and image processing, and more specifically, to techniques used to stream video data.

BACKGROUND

Computing devices and systems may include hardware and software configured to execute one or more software applications, and to display information associated with such software applications on display devices. For example, a computer system may include a host processor and a hard drive used to execute a software application, and data associated with the software application may be displayed in a monitor of the computer system. Such data may be video data that is streamed from a video source. Accordingly, components of a computing device may retrieve video data and process such video data for display at a target device. However, conventional techniques remain limited in their ability to efficiently use resources, such as internal memory, when streaming such video data.

DETAILED DESCRIPTION

Figure 1:
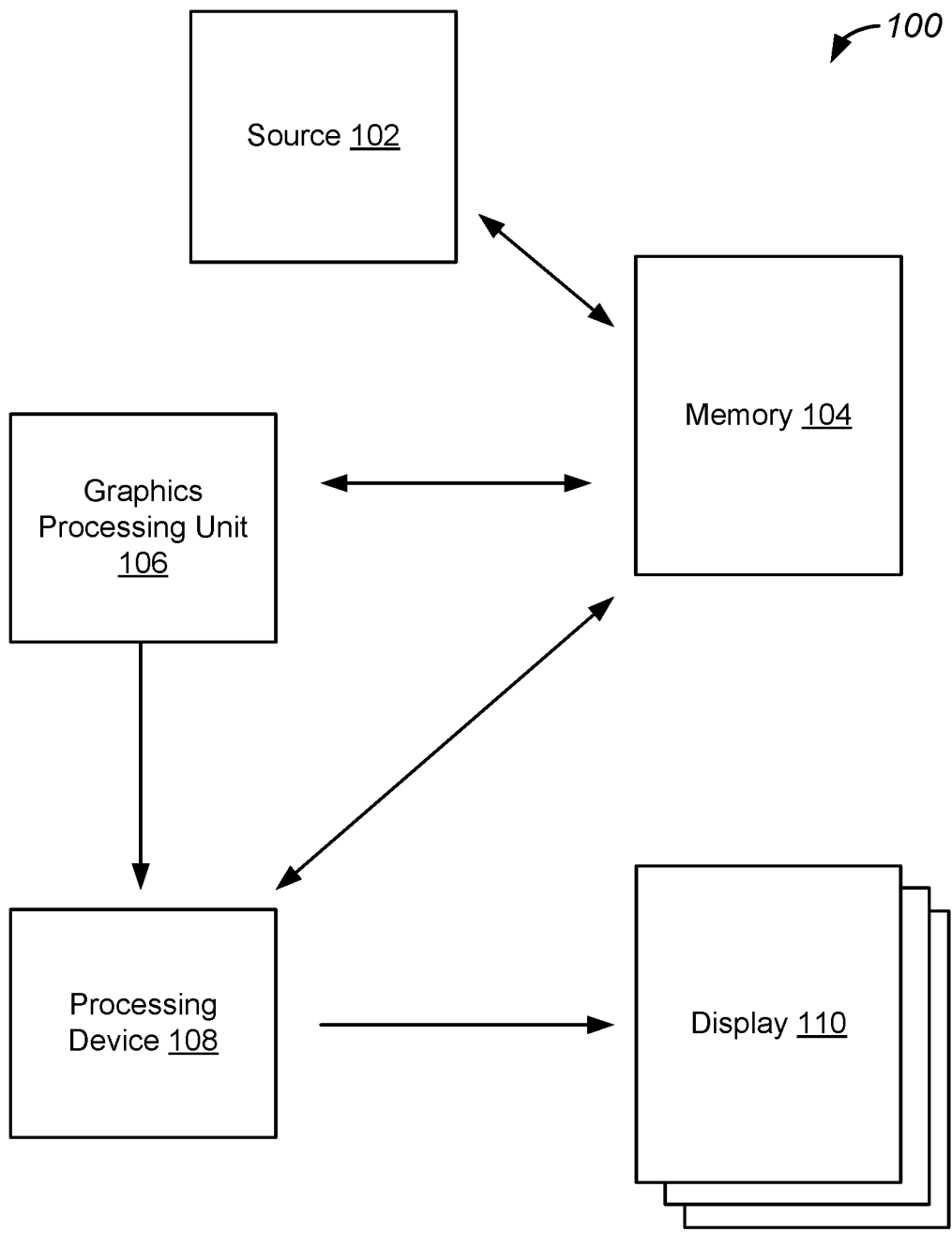
FIG. 1 illustrates an example of a system for video source and destination synchronization, configured in accordance with some embodiments.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Computer systems may be configured to render and display graphical data in one or more target display devices. The rendering and display of such graphical data may involve the implementation of one or more transformation operations on the graphical data itself. For example, the rendering process may include resizing or rescaling of an image. Furthermore, the rendering and display of such data may include various fetch and store operations in which intermediary components between a source of video data and a sink may use fetch and store commands to trigger the transmission of video data. As will be discussed in greater detail below, a source of video data may be a software application or other source of streaming video, and a sink for video data may be a target display device.

Some computer systems include a video source and sink that are not directly connected by ready/valid handshake signals, and instead a source stream has a store unit, which writes pixel data into a memory device, such as a random-access memory (RAM), and a display stream a fetch unit, which reads that data from the same RAM location. Accordingly, a full-sized frame buffer may be implemented in RAM. Such systems remain limited because the amount of memory used can be very large as multiple full-sized frames must be stored in memory that may be used for other applications as well. Accordingly, the full-sized frame buffers use a substantial amount of system resources and also generate a substantial overhead on bandwidth used to transmit such frames to and from memory. Moreover, the store and fetch operations from memory are not synchronous. Accordingly, conventional systems experience interruptions in streaming due to a desynchronization between a source and sink.

Embodiments disclosed herein provide the implementation of a buffer and controller configured to synchronize the operation of fetch and store operations associated with portions of video frames. Accordingly, as will be discussed in greater detail below, the use of portions of frames allows the use of a relatively small buffer that is smaller than a video frame, thus substantially reducing the amount of memory and associated bandwidth used for such fetch and store operations. Moreover, the controller may selectively stall either the fetch operation or the store operation by a designated amount of time to ensure that operation of both remains synchronous. In this way, the controller is configured to implement a "handshake" between the video source and video sink, and ensure consistent and uninterrupted streaming of video data.

FIG. 1 illustrates an example of a system for video source and destination synchronization, configured in accordance with some embodiments. As will be discussed in greater detail below, a system, such as system 100, may be implemented to synchronize fetch and store operations associated with a video source and sink. More specifically system 100 may include one or more components configured to implement a "handshake" between a video source and a video sink, and to ensure that a stream of video data is continuous while also ensuring that the use of system resources is minimized.

Thus, according to various embodiments, system 100 includes source 102 that is configured to provide data that is ultimately displayed in a display device, as will be discussed in greater detail below. More specifically, source 102 may be configured to execute one or more software applications configured to generate graphical data to be displayed in a display device as, for example, may be included in a user interface generated for a particular software application. Additional details regarding such software applications and graphical data are discussed in greater detail below with reference to FIG. 2.

In various embodiments, source 102 is communicatively coupled to a memory device, such as memory 104. In various embodiments, memory 104 is a memory device such as a random-access memory (RAM). In one example, memory 104 is a video random-access memory (VRAM) device. Moreover, memory 104 may be communicatively coupled to source 102, and may include one or more buffers configured to store graphical data from source 102. Accordingly, the buffers may be used to store images or frames included in the graphical data.

System 100 additionally includes processor 106 which may be a graphics processing unit (GPU) that is configured to implement one or more rendering operations on graphical data. Accordingly, processor 106 may receive graphical data from source 102, and may implement one or more graphical rendering operations on the graphical data. For example, the graphical data may include various video frames, and each frame may be processed by processor 106. More specifically, one or more pixel mapping or transformation operations may be implemented for each frame of the video data. The rendered frames may then be provided as an output for transmission to a target display device, such as display 110 discussed in greater detail below.

It will be appreciated that while various embodiments disclosed herein describe systems and devices in use with a graphics processing unit, other types of graphics devices may be used as well. For example, rendering of video data may be performed by a video capture controller of a camera or a JPEG decoder used in associated with picture and image data. Accordingly, embodiments disclosed herein are not limited to a graphics processing unit or video data.

System 100 further includes processing device 108 that is configured to synchronize fetch and store operations between source 102 and display 110, which may also be transmitted via processor 106. More specifically, processing device 108 may be configured to selectively stall fetch and store units in ensure that the different operations do not decouple and become sufficiently desynchronized to interrupt streaming of the video data. For example, processing device 108 may stall store operations associated with source 102 if a buffer is full, and may stall fetch operations associated with display 110 if a designated number of lines are not free in the buffer. Accordingly, as will be discussed in greater detail below with reference to FIG. 2, processing device 108 may include various components, such as a buffer and a controller, that are configured to synchronize fetch and store operations associated with video transmissions from a source to a sink.

System 100 further includes display 110 which is configured to display the results of the rendering processing operations. Accordingly, display 110 may be a display device, such as a liquid crystal display (LCD) screen. As will be discussed in greater detail below, display 110 may include various components configured to receive rendered graphical data, and to display such rendered graphical data.

Figure 2:
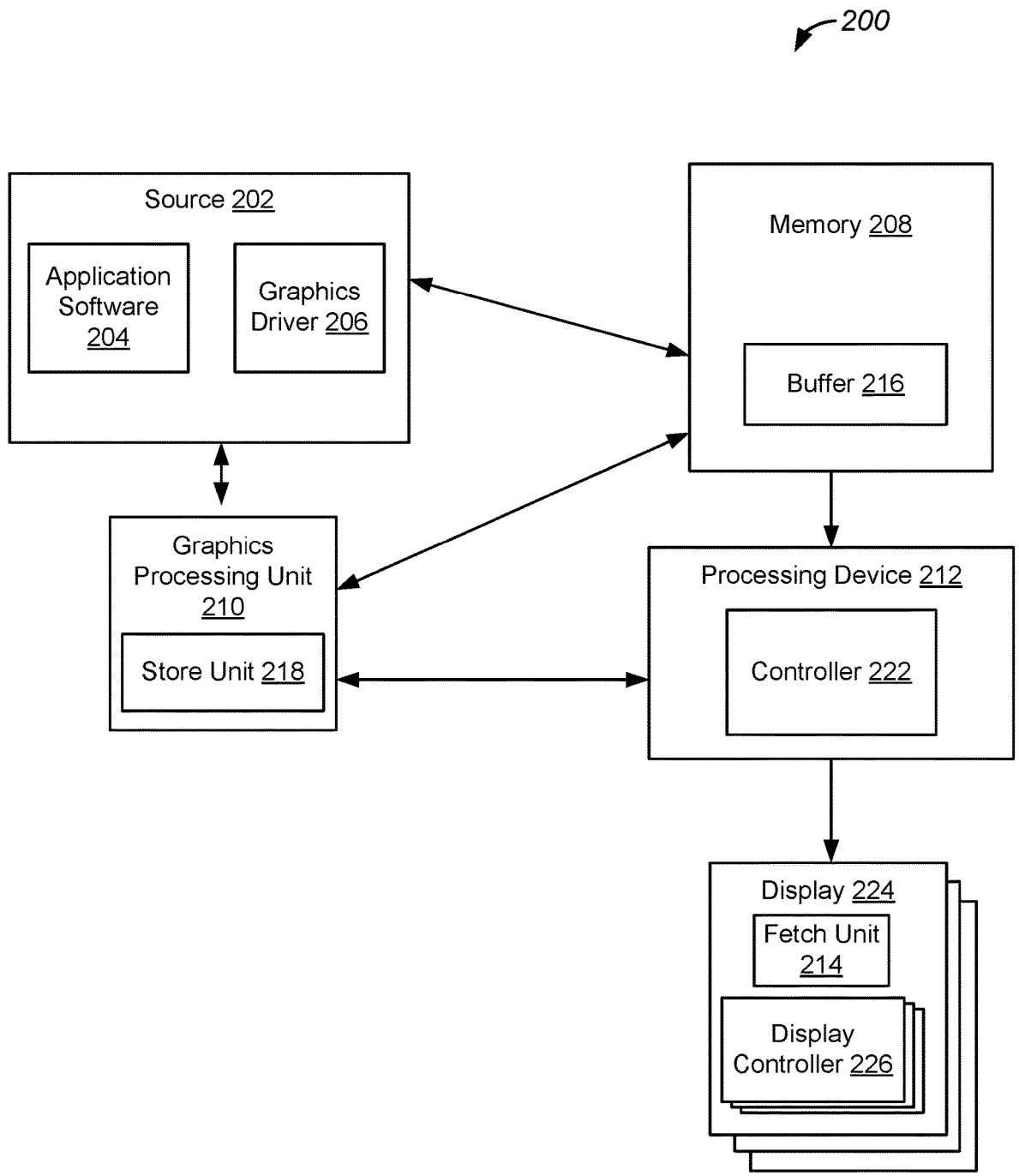
FIG. 2 illustrates another example of a system for video source and destination synchronization, configured in accordance with some embodiments.

FIG. 2 illustrates another example of a system for video source and destination synchronization, configured in accordance with some embodiments. As will be discussed in greater detail below, a system, such as system 200, may be implemented to synchronize fetch and store operations associated with a video source and sink. More specifically system 200 may include a controller and a buffer specifically configured to ensure that a stream of video data is continuous while also ensuring that the use of system resources is minimized.

Accordingly, as similarly discussed above, system 200 may include a video source, such as source 202 that is configured to provide data that is ultimately displayed in a display device, as will be discussed in greater detail below. More specifically, source 202 may be configured to execute one or more software applications configured to generate graphical data to be displayed in a display device as, for example, may be included in a user interface generated for a particular software application. Accordingly, source 202 may include application software, such as application software 204, that is configured to generate one or more commands associated with the transmission and display of video data, as well as generate graphical data representing the video that is being transmitted. In various embodiments, source 202 further includes graphics driver 206 which is configured to translate such software commands into commands native to the hardware of system 200.

In various embodiments, source 202 is communicatively coupled to a memory device, such as memory 208. In various embodiments, memory 208 is a memory device such as a random-access memory (RAM). In one example, memory 208 is a video random-access memory (VRAM) device. Moreover, memory 208 may be communicatively coupled to source 202, and may include one or more buffers configured to store graphical data from source 202. For example, such buffers may be frame buffers that are specifically configured to store images or frames included in the graphical data.

In various embodiments, memory 208 includes buffer 216 that is configured to store lines of video data being transmitted from a system component, such as graphics processing unit 210 and display 224. In various embodiments buffer 216 is implemented using a portion of memory 208. Accordingly, buffer 216 may be implemented by reserving a portion of RAM or VRAM included in memory 208. In some embodiments, buffer 216 may be implemented using a separate memory device. Accordingly, buffer 216 may be implemented in a memory device that is different than memory 208, or may be implemented in a dedicated buffer memory element that may be included in or implemented separate from memory 208. Moreover, buffer 216 may be configured as a ring buffer that cycles through a portion or subset of lines in a video frame as fetch and store operations are implemented.

In various embodiments, a size of buffer 216 is configurable, and may be determined based on one or more configuration parameters. For example, an entity, such as a user or an administrator may set the size of a buffer during a configuration operation. In some embodiments, the size of buffer 216 may be determined by controller 222, discussed in greater detail below, based on one or more parameters of application software 204, such as an output resolution of video data generated by application software 204. As will be discussed in greater detail below, a size of buffer 216 may be smaller than a single video frame included in the video data. More specifically, buffer 216 may have fewer lines that a single frame of video data. In this way, a size of buffer 216 may be significantly smaller than a size of a video frame, and system resources may be reduced when compared to a frame buffer System 200 additionally includes graphics processing unit 210 that is configured to implement one or more rendering operations on graphical data. Accordingly, as discussed above, graphics processing unit 210 may receive graphical data from source 102, and may implement one or more graphical rendering operations on the graphical data. Thus, graphics processing unit 210 may include a processor and dedicated memory specifically configured to implement rendering operations, such as the one or more pixel mapping or transformation operations discussed above. As also discussed above, rendered frames may be provided as an output for transmission to a target display device.

In various embodiments, graphics processing unit 210 includes store unit 218 that is configured to store graphical data based on a store command that was generated based on, for example, a signal received source 202. As similarly discussed above, graphical data that is stored may be stored at a storage location, such as buffer 216, and may include a portion of graphical data, such as specific line of a frame of video data. Accordingly, store unit 218 may be configured to identify and store such lines of video data in response to receiving a command.

In various embodiments, system 200 additionally includes processing device 212 that, as similarly discussed above, is configured to synchronize fetch and store operations between source 202 and display 224. In various embodiments, processing device 212 includes controller 222 which is configured to control the operation of and manage the interaction between fetch unit 214 and store unit 218. More specifically, controller 222 is configured to command fetch unit 214 and store unit 218 to implement fetch and store operations, and is also configured to selectively stall fetch unit 214 and/or store unit 218 to ensure that the different operations do not decouple and become sufficiently desynchronized to interrupt streaming of the video data. More specifically, controller 222 may be configured to determine parameters identifying conditions when store operations associated with store unit 218 should be stalled, and may also be determine parameters identifying conditions when fetch operations associated with fetch unit 214 should be stalled. Additional details regarding the computation and determination of such parameters are discussed in greater detail below with regards to FIGS. 3-6. Accordingly, controller 222 may include one or more processors configured to determine when fetch and store operations should be implemented by fetch unit 214 and store unit 218, and may be configured to generate signals implementing such operations.

In various embodiments, controller 222 may also be configured to receive an enable indication and generate an enable signal for fetch and store units. Accordingly, controller 222 may be configurable to selectively enable and disable the synchronization techniques disclosed herein based on one or more detected conditions, such as the setting of a bit, or the receiving of an input signal. In one example, such an input signal may be received from a user or administrator during a configuration operation.

As noted above, system 200 further includes display 224 which is configured to display the results of the fetch operations executed on buffer 216. In various embodiments, display 224 includes fetch unit 214 that may be configured to fetch graphical data based on a fetch command that was generated based on, for example, a signal received from a component of display 224, such as display controller 226 discussed in greater detail below. In various embodiments, the graphical data that is fetched may be fetched from a storage location, such as buffer 216, via processing device 212, and may include a portion of graphical data. More specifically, the fetch operation may be implemented for a specific line of a frame of video data. Accordingly, fetch unit 214 may be configured to identify and retrieve such lines of video data in response to receiving a command.

As discussed above, display 224 may be a display device, such as a liquid crystal display (LCD) screen. In various embodiments, display 224 includes include various components configured to receive rendered graphical data, and to display such rendered graphical data. For example, display 224 may include display controller 226 which is configured to generate a video signal that is ultimately displayed in a display device of display 224. Accordingly, display controller 226 may manage the operation of the display device based, at least in part, on the received rendered graphical data.

It will be appreciated that while various embodiments disclosed herein are described with reference to lines of video data and video frames, it will be appreciated that any suitable unit, portion, or partition of data may be used. For example, blocks of video data may be used as the basis of buffer parameter and synchronization parameter determination, as will be discussed in greater detail below. Accordingly, embodiments disclosed herein are not limited to the use of lines of video data.

Figure 3:
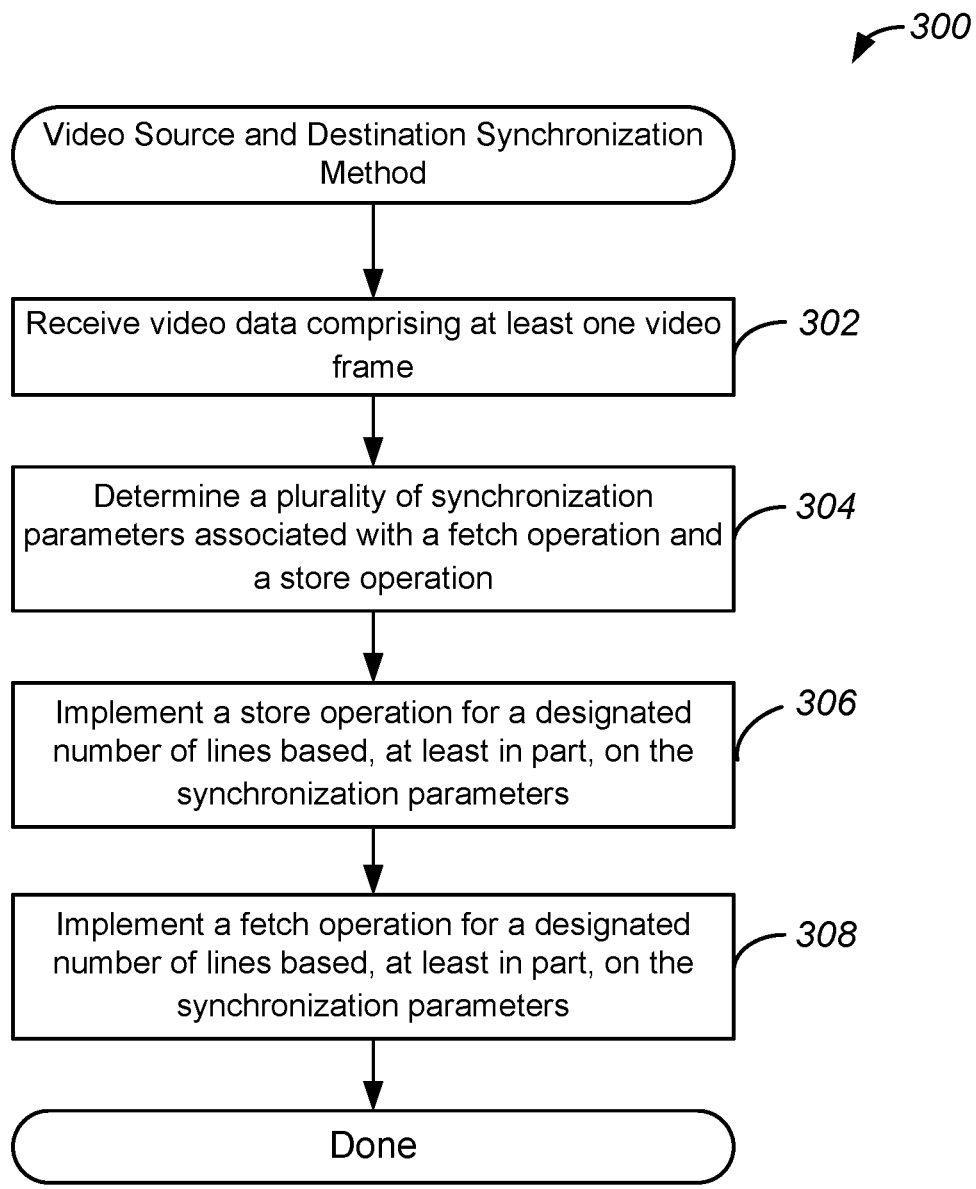
FIG. 3 illustrates a flow chart of an example of a method for video source and destination synchronization, implemented in accordance with some embodiments.

FIG. 3 illustrates a flow chart of an example of a method for video source and destination synchronization, implemented in accordance with some embodiments. As will be discussed in greater detail below, a method, such as method 300, may be implemented to synchronize fetch and store operations associated with a video source and sink. Accordingly, one or more operations of method 300 may be used to implement a "handshake" between the two, and ensure that a stream of video data is continuous while also ensuring that the use of system resources is minimized. In this way, method 300 may provide continuous video streaming while also increasing the efficiency of resources used for such video streaming.

Method 300 may proceed to operation 302 during which video data may be received. In various embodiments, the video data is a video stream generated by a video source. For example, a software application, as discussed above, may generate a stream of video data that is to be displayed in a target display. As also discussed above, the video data may include graphical data associated with a user interface and/or video media. More specifically, the streamed video data may include various frames of a video, and each frame may include lines of pixel data. Accordingly, during operation 302, video data may be received from a system component, such as a graphics processor or other system component.

Method 300 may proceed to operation 304 during which a plurality of synchronization parameters may be determined. As similarly discussed above, the synchronization parameters are configured to synchronize fetch and store operations associated with a video source and sink, and to implement a "handshake" between the two. As will be discussed in greater detail below, the synchronization parameters are determined and implemented by a component, such as a controller, and are configured to identify the bounds of such fetch and store operations, as well as whether or not either fetch or store operations should be stalled. As will also be discussed in greater detail below, such synchronization parameters may be determined based, at least in part, on a size of a buffer as well as a number of available lines within the buffer.

Method 300 may proceed to operation 306 during which a store operation may be implemented for a designated number of lines based, at least in part, on the synchronization parameters. Accordingly, a designated number of lines may be scanned from the received video data, and may be stored in lines of a buffer. As will be discussed in greater detail below, the store operation may be implemented in accordance with the synchronization parameters. More specifically, a number of lines as well as a timing of the timing of the store operation, such as whether or not the store operation should be stalled for a designated period of time, may be determined by the synchronization parameters.

Method 300 may proceed to operation 308 during which a fetch operation may be implemented for a designated number of lines based, at least in part, on the synchronization parameters. Accordingly, a designated number of lines may be scanned from the buffer, and may be sent to a video sink, which may be a target display. As will be discussed in greater detail below, the fetch operation may be implemented in accordance with the synchronization parameters. More specifically, a number of lines as well as a timing of the timing of the fetch operation, such as whether or not the fetch operation should be stalled for a designated period of time, may be determined by the synchronization parameters.

Figure 4:
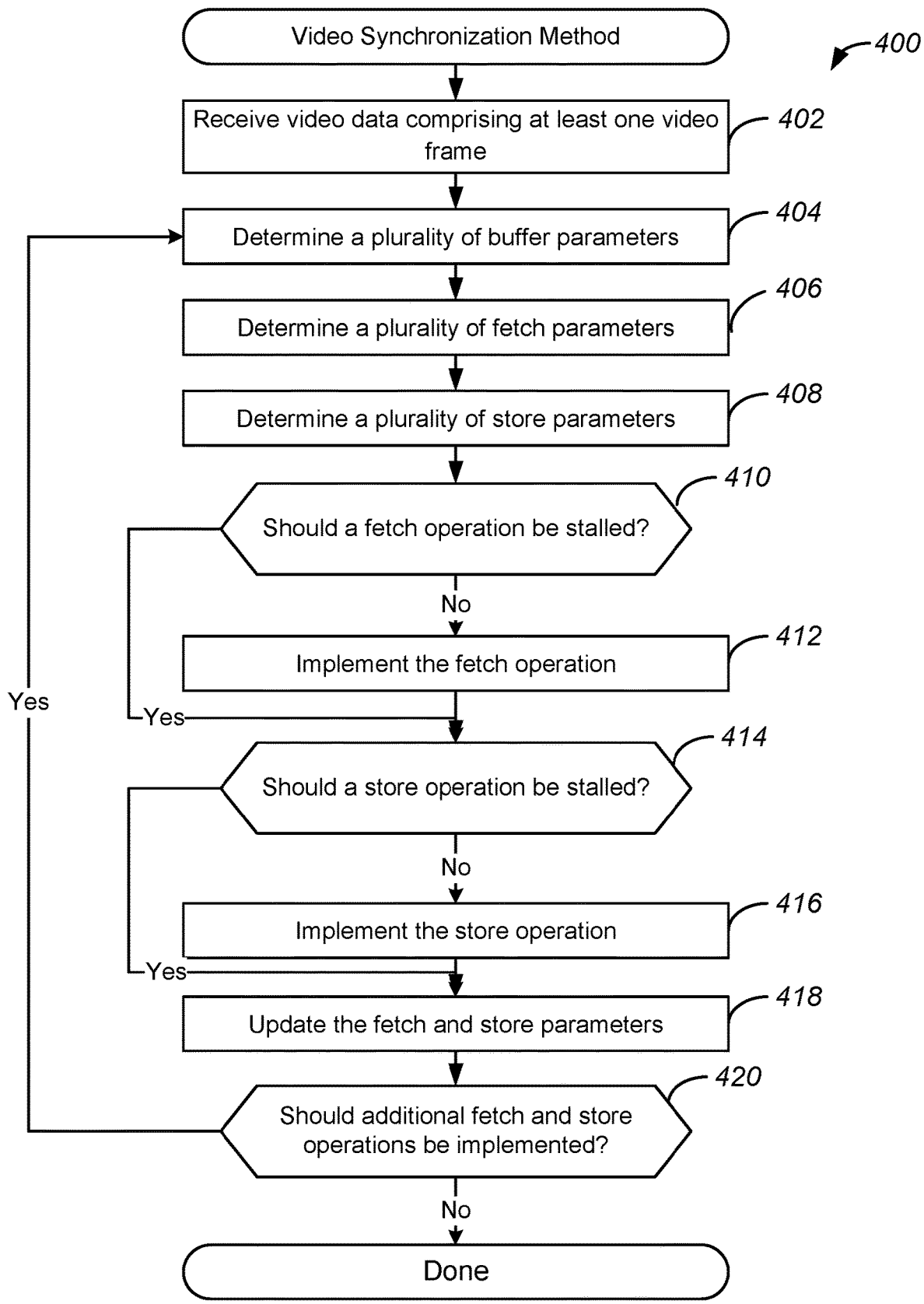
FIG. 4 illustrates a flow chart of an example of a method for video source and destination synchronization, implemented in accordance with some embodiments.

FIG. 4 illustrates a flow chart of an example of a method for video source and destination synchronization, implemented in accordance with some embodiments. As similarly discussed above, a method, such as method 400, may be implemented to synchronize fetch and store operations associated with a video source and sink. As will be discussed in greater detail below, a system component, such as a controller, may be configured to manage the implementation of fetch and store operations to ensure continuity of video data streaming. In this way, method 400 may provide continuous video streaming while also increasing the efficiency of resources used for such video streaming.

Method 400 may proceed to operation 402 during which video data may be received. As discussed above, video data may be a video stream generated by a video source. For example, a software application, as discussed above, may generate a stream of video data that is to be displayed in a target display. As discussed above, the video data may include graphical data associated with a user interface and/or video media. More specifically, the streamed video data may include various frames of a video, and each frame may include various pixel data represented as lines of pixels.

Method 400 may proceed to operation 404 during which a plurality of buffer parameters may be determined. In various embodiments, the buffer parameters may identify one or more aspects of the buffer, such as a buffer size. More specifically, the buffer parameters may identify a number of lines stored in the buffer, and may also maintain a mapping of such buffer lines to frame lines included in received video data. For example, a video frame may have been received, and the video frame may have lines of data corresponding to lines of pixels in the frame. As discussed above and as will be discussed in greater detail below with reference to FIG. 6, the buffer may be configured as a ring buffer and may include a number of lines smaller than the number of lines included in the frame. Accordingly, the buffer lines may be mapped to frame lines as fetch and store operations proceed through the frame in a line-by-line manner. During operation 402, a system component, such as a controller, may query the buffer to retrieve information, such as the buffer size, as well as the mapping information discussed above. In some embodiments, the controller may store and maintain the mapping information itself based on counting implemented upon receipt of a new frame, as may be identified in the received video data.

Method 400 may proceed to operation 406 during which a plurality of fetch parameters may be determined. In various embodiments the fetch parameters are configured to identify a currently active line for a fetch operation as well as a point at which a fetch operation should be stalled. Accordingly, the fetch parameters may identify a current line that will be used for the next fetch operation. Moreover, the fetch parameters may further identify a particular line in the buffer at which a fetch operation should be stalled to wait for a store operation to complete and advance. As will be discussed in greater detail below with reference to FIG. 5, a system component, such as a controller, may determine such fetch parameters by querying the buffer and implementing one or more computations.

Method 400 may proceed to operation 408 during which a plurality of store parameters may be determined. In various embodiments the store parameters are configured to identify a currently active line for a store operation as well as a point at which a store operation should be stalled. Accordingly, the store parameters may identify a current line that will be used for the next store operation. Moreover, the store parameters may further identify a particular line in the buffer at which a store operation should be stalled to wait for a fetch operation to complete and advance. As will be discussed in greater detail below with reference to FIG. 5, a system component, such as a controller, may determine such store parameters by querying the buffer and implementing one or more computations. Accordingly, in this way, the controller may determine parameters used to synchronize the activity of the fetch and store operations, and ensure that one stays within a designated number of lines from the other.

Method 400 may proceed to operation 410 during which it may be determined if a fetch operation should be stalled. Accordingly, a system component, such as a controller may determine if a fetch operation should be stalled based, at least in part, on the fetch parameters and a comparison of different fetch parameters. More specifically, if a current fetch line is equal to an identified stop line, method 400 may proceed to operation 414 discussed in greater detail below. If a current fetch line is less than an identified stop line, method 400 may proceed to operation 412.

Accordingly, during operation 412 during a fetch operation may be implemented. In some embodiments, a fetch operation may be implemented for a target video display, also referred to herein as a video sink. Accordingly, one or more lines may be fetched and read out from the buffer, and may be provided to the target video display. In this way, the target video display may be presented with an output of the buffer that has been synchronized in accordance with the implementation of the buffer and controller disclosed herein.

Method 400 may proceed to operation 414 during which it may be determined if a store operation should be stalled. Accordingly, a system component, such as a controller may determine if a store operation should be stalled based, at least in part, on the store parameters and a comparison of different store parameters. More specifically, if a current store line is equal to an identified stop line, method 400 may proceed to operation 418 discussed in greater detail below. If a current store line is less than an identified stop line, method 400 may proceed to operation 416.

Method 400 may proceed to operation 416 during which a store operation may be implemented. In some embodiments, a store operation may be implemented for a video source. Accordingly, one or more lines may be received from the video source and may be stored in the buffer. In this way, video data may be received from a video source and stored in a buffer in a manner that has been synchronized in accordance with the implementation of the buffer and controller disclosed herein.

Method 400 may proceed to operation 418 during which the fetch and store parameters may be updated. Accordingly, the numbers or indexes identifying currently active lines for fetch and store operations may be updated based on the activity above. For example, if fetch and store operations were implemented, their buffer index numbers as well as frame index numbers may be incremented. The incremented numbers may then be used in a subsequent operation if one is performed, as noted below.

Method 400 may proceed to operation 420 during which it may be determined if additional fetch and store operations should be implemented. Such a determination may be made based, at least in part, on a line number as well as an indication of a stop of a video stream. For example, if an end line of a frame has not been reached by both the fetch and store operations, it may be determined that additional fetch and/or store operations should be implemented, and method 400 may return to operation 404. If it is determined that an end line of a frame has been reached by both the fetch and store operations and there are no additional frames, method 400 may terminate.

Figure 5:
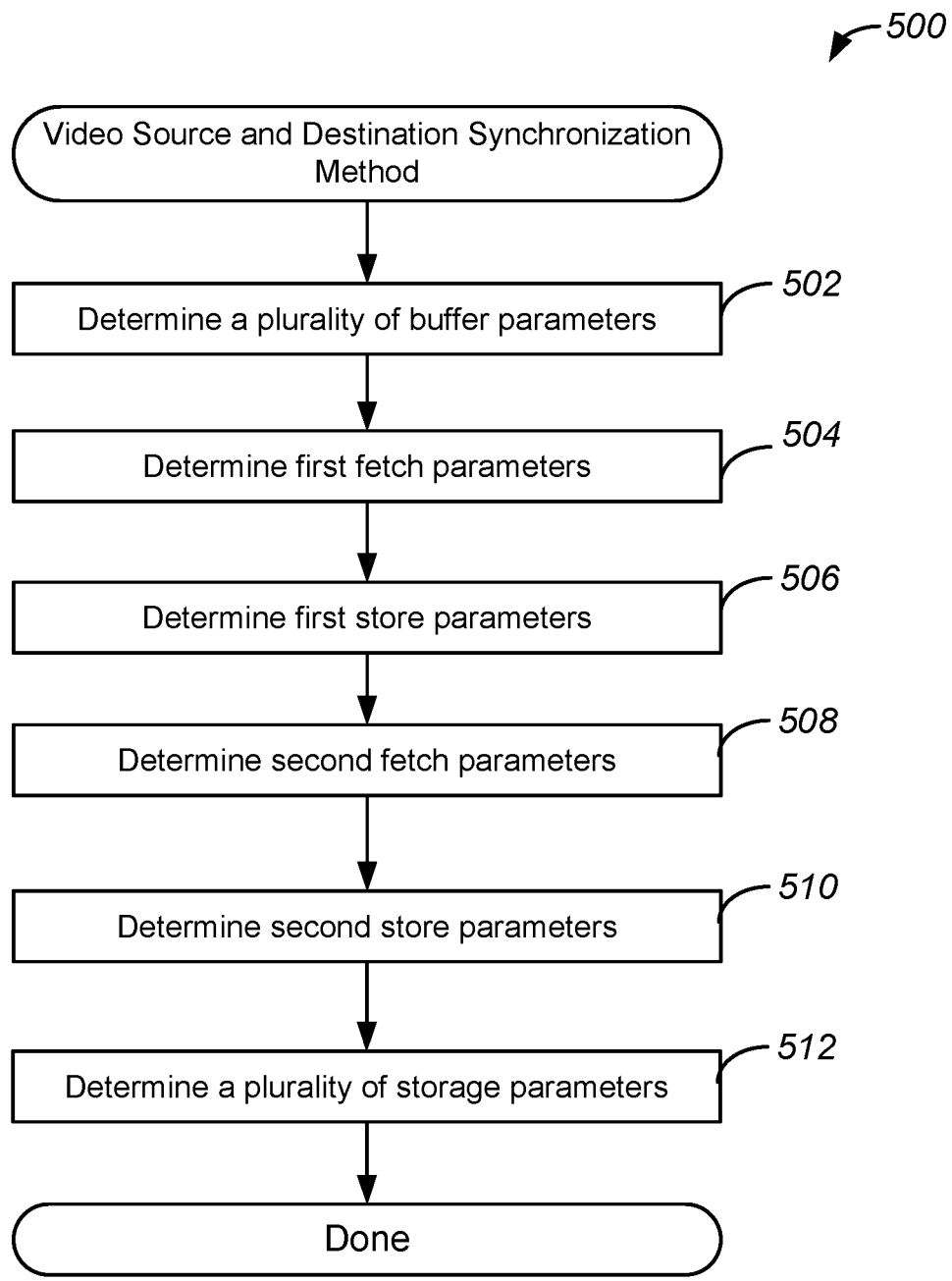
FIG. 5 illustrates a flow chart of yet another example of a method for video source and destination synchronization, implemented in accordance with some embodiments.

FIG. 5 illustrates a flow chart of yet another example of a method for video source and destination synchronization, implemented in accordance with some embodiments. As similarly discussed above, a method, such as method 500, may be implemented to synchronize fetch and store operations associated with a video source and sink. As will be discussed in greater detail below, a system component, such as a controller, may be configured to compute specific parameters and buffer lines used to manage the implementation of fetch and store operations to ensure continuity of video data streaming. In this way, method 500 may provide continuous video streaming while also increasing the efficiency of resources used for such video streaming.

Method 500 may proceed to operation 502 during which a plurality of buffer parameters may be determined. As discussed above, the buffer parameters may identify one or more aspects of the buffer, such as a buffer size. More specifically, the buffer parameters may identify a number of lines stored in the buffer, and may also maintain a mapping of such buffer lines to frame lines included in received video data. In one example, a buffer may currently have eight lines available, and each line may be configured to store a designated number of data values. In one example, each line may store a buffer index number, an associated frame index number, as well as associated video data, such as pixel data, for that line. Accordingly, during operation 502, a system component, such as a controller, may query the buffer to identify the buffer size as well as a current location within a frame.

Method 500 may proceed to operation 504 during which first fetch parameters may be determined. As similarly discussed above, the fetch parameters are configured to identify a currently active line for a fetch operation. Accordingly, the fetch parameters may identify a current line that will be used for the next fetch operation. In one example, the currently active line for the fetch operation may be determined by a component, such as a controller, by querying the buffer. In another example, the currently active line for the fetch operation may be determined by the controller via the use of a counter that may count fetch operations implemented on lines of the buffer.

Method 500 may proceed to operation 506 during which first store parameters may be determined. As similarly discussed above, the store parameters are configured to identify a currently active line for a store operation. Accordingly, the store parameters may identify a current line of the buffer that will be used for the next store operation. As similarly discussed above, the currently active line for the store operation may be determined by a component, such as a controller, by querying the buffer. In another example, the currently active line for the store operation may be determined by the controller via the use of a counter that may count store operations implemented on lines of the buffer.

Method 500 may proceed to operation 506 during which second fetch parameters may be determined. As also discussed above, a system component, such as a controller, may identify a fetch stop line that is configured to identify a point at which a fetch operation should be stopped or stalled to wait for a store operation to complete and advance. In various embodiments, a system component such as a controller, may determine such a fetch stop line based, at least in part, on the currently active store line. Thus, according to some embodiments, the fetch stop line may be set to the currently active store line, or the currently active store line with a designated offset. For example, the fetch stop line may be set to the currently active store line minus one. It will be appreciated that the offset may be any suitable number of lines. More specifically, the offset may be three lines to provide additional separation between the fetch and store operations.

Method 500 may proceed to operation 510 during which second store parameters may be determined. As also discussed above, a system component, such as a controller, may identify a store stop line that is configured to identify a point at which a store operation should be stopped or stalled to wait for a fetch operation to complete and advance. In various embodiments, a system component such as a controller, may determine such a store stop line based, at least in part, on the buffer parameters discussed above. For example, the store stop line may be set to the last line of the buffer. In some embodiments, the store stop line may be determined dynamically. For example, the store stop line may be set to a fetch line, and may also incorporate an offset, such as a number of lines that are kept or reserved. Thus, the store stop line may be set to the fetch line minus an offset value that may be a number of lines to be kept or reserved. It will be appreciated that the fetch and store parameters discussed above may be stored as index numbers associated with buffer lines. Accordingly, the parameters may identify specific lines in the buffer, and in the context of a current fetch and store operation.

Method 500 may proceed to operation 512 during which storage parameters may be determined. In various embodiments the storage parameters identify a designated number of lines that are kept or reserved in the buffer after a fetch operation has been implemented. For example, a designated number of three lines may be identified and protected after a current fetch operation. In this way, a designated number of lines may be maintained in memory after a fetch operation to enable re-sampling by a target display device. In various embodiments, the number of designated lines identified by the storage parameters may be determined based on a re-sampling technique used by the target display device. In one example, a system component, such as a controller, may query the target display device to determine the re-sampling technique, or the target display device may identify the technique to the controller. In some embodiments, a predetermined mapping may be used to identify a number of lines based on the identified technique. Such a mapping may have been determined during an initial configuration process by an entity such as a user or administrator.

Figure 6:
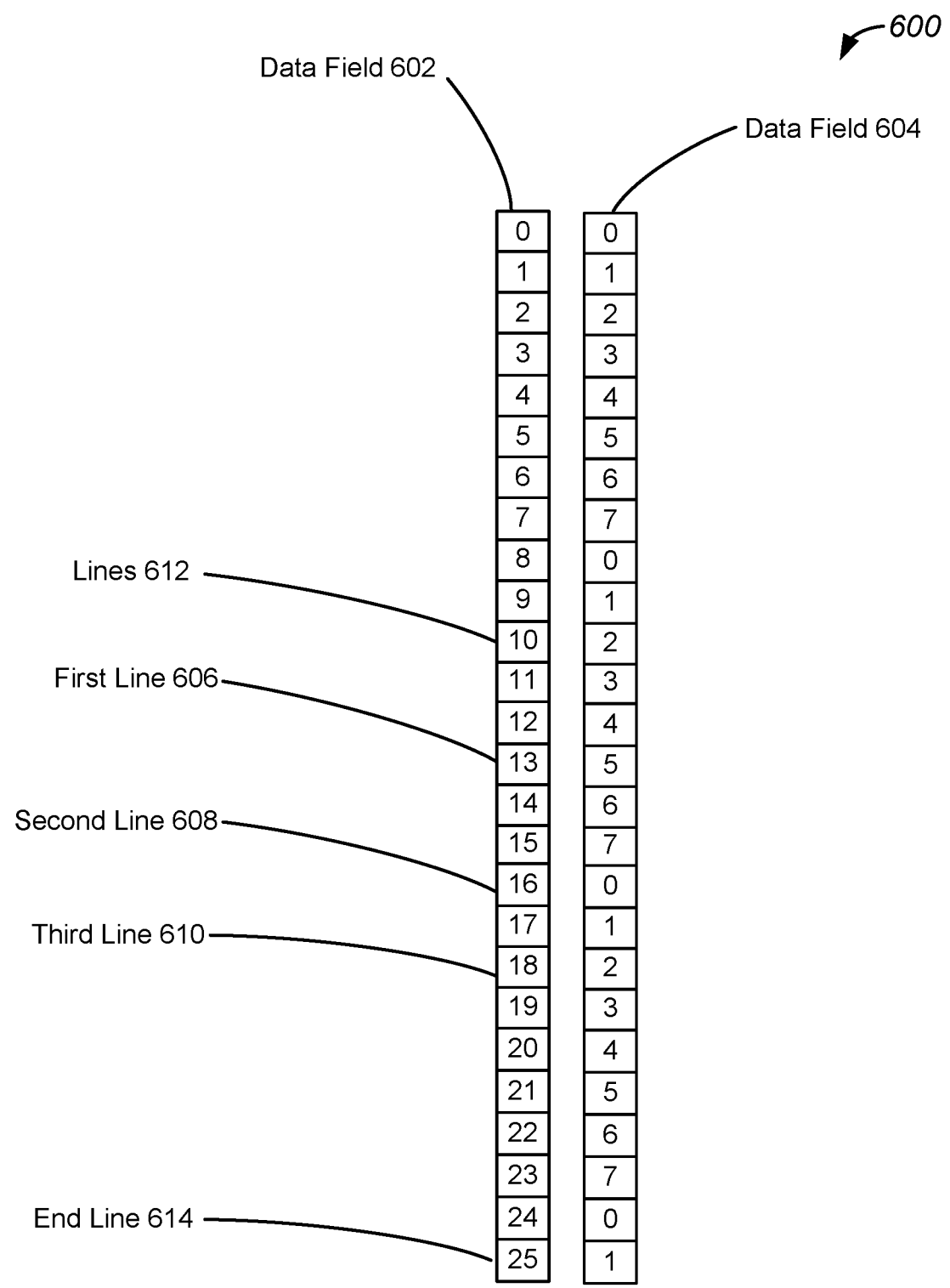
FIG. 6 illustrates an example of a diagram of lines in a buffer, implemented in accordance with some embodiments.

FIG. 6 illustrates an example of a diagram of lines in a buffer, implemented in accordance with some embodiments. As discussed above, fetch and store operations associated with a video source and sink may be synchronized. As shown in image 600, various fetch and store parameters may be used to identify lines in a buffer that may delineate boundaries for such fetch and store operations, and to determine if one or the other should be stalled to ensure synchrony.

More specifically, image 600 includes data field 602 and data field 604 which represent line numbers in a frame and buffer. In various embodiments, the line numbers are index numbers that system components, such as a controller and a buffer, may use to identify such lines. As shown in FIG. 6, data field 602 includes index numbers for each line of a video frame that is being rendered and transmitted. Data field 604 includes corresponding lines of a buffer that are mapped to those lines. As shown in FIG. 6, the buffer may be a ring buffer that continually wraps around as operations progress. Accordingly, the number of lines in the buffer is smaller than the number of lines in the video frame, and each line of the buffer may be used multiple times in the process of transmitting a single video frame.

Image 600 further illustrates first line 606 which may be a fetch line, as discussed above with reference to at least FIG. 5. Accordingly, first line 606 may identify a currently active line associated with a fetch operation. Moreover, image 600 additionally illustrates second line 608 which is a store line, as discussed above with reference to at least FIG. 5. Accordingly, second line 608 may identify a currently active line associated with a store operation. In various embodiments, second line 608 is also identified as a stop line for the fetch operation, as discussed above with reference to at least FIG. 5. Accordingly, the fetch unit will stop implementing fetch operations when it reaches second line 608.

Image 600 further illustrates third line 610 which may be a stop line for the store operation, as discussed above with reference to at least FIG. 5. Accordingly, the store unit will stop implementing store operations when it reaches third line 610. As discussed above, a system component, such as a controller, may have determined first line 606, second line 608 and third line 610. Image 600 additionally illustrates lines 612 which may be lines reserved for resampling, as discussed above. Accordingly, lines 612 may be maintained relative to first line 606 to enable re-sampling techniques used by a target display device. In various embodiments, end line 614 represents and end of a frame.

It will be appreciated that upon completion of a fetch operation and/or a store operation, the lines identified above may be updated. For example, the fetch line and store line may be incremented and updated, and their associated stop lines may be recomputed as well. It will also be appreciated that because the store operations are associated with the activity of a video source and the fetch operations are associated with the activity of a video sink, such activity of the video source and sink might not be synchronous. However, synchronization of their associated fetch and store operations is implemented by the controller and the buffer via the computation and use of stop lines to selectively stall fetch and store units when appropriate, thus ensuring continuity in the streaming of data.

Figure 7:
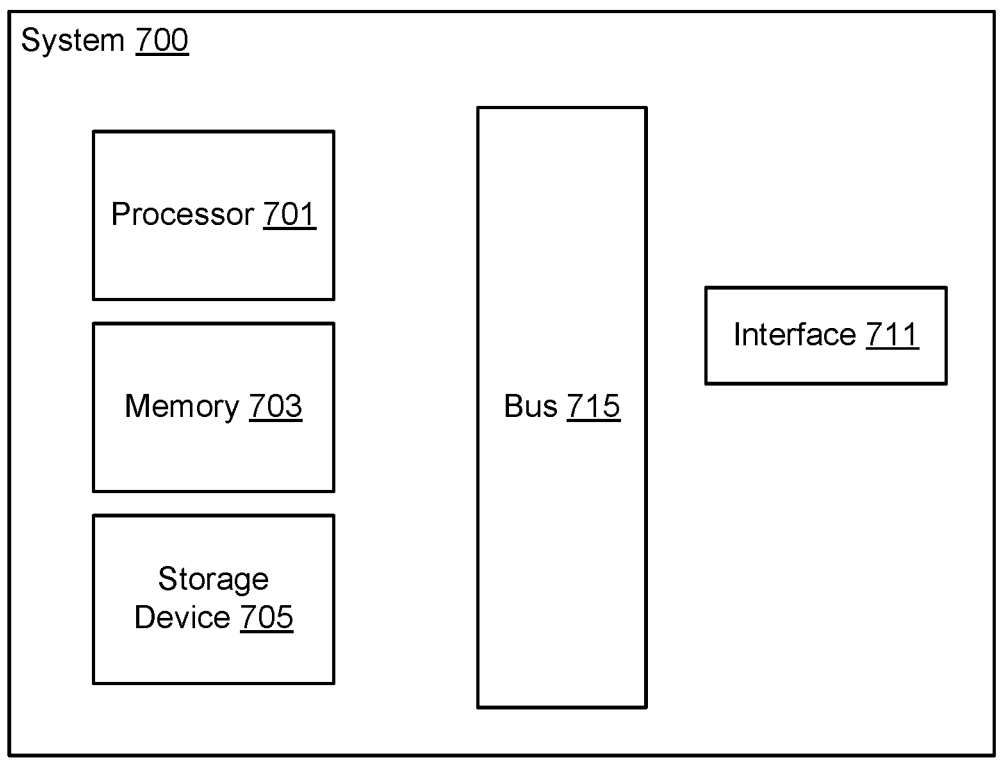
FIG. 7 illustrates an example of components of a processing device, configured in accordance with some embodiments.

FIG. 7 illustrates an example of components used to implement a processing device, configured in accordance with some embodiments. Accordingly, a system, such as system 700 described below, may be used to implement the components of controllers and/or processing devices discussed above. In various embodiments, system 700 includes processor 701, memory 703, storage device 705, interface 711 (e.g., a PCI bus or other interconnection fabric configured to couple to other peripheral devices), and bus 715. In some embodiments, processor 701 may be a host processor or central processing unit (CPU), and memory 703 may be part of a CPU subsystem. Storage device 705 may be part of a GPU subsystem and may include VRAM. Thus, components of system 700 may operate as variety of components discussed above, such as controllers and buffers. Although a particular configuration is described, a variety of alternative configurations are possible. Processor 701 may perform operations such as those described herein. Instructions for performing such operations may be embodied in memory 703 on one or more non-transitory computer readable media, or on some other storage device. Various specially configured devices can also be used in place of or in addition to the processor 701. The interface 711 may be configured to send and receive data values to and from other system components, such as a display, as discussed above with reference to FIGS. 1 and 2.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
receiving video data from a video source, the video data comprising at least one video frame;
determining, using one or more processors, a plurality of store parameters associated with a store operation and a plurality of fetch parameters associated with a fetch operation for a portion of the video data, wherein the plurality of store parameters identify a currently active store line and a store stop line defining when a store unit of a source stream should be stalled, wherein the plurality of fetch parameters identify a currently active fetch line and a fetch stop line defining when the fetch unit of a display stream should be stalled, wherein the stop lines define bounds of the store operation and the fetch operation to ensure synchronization between a source stream and a display stream, and wherein the fetch stop line is determined based on the currently active store line;
implementing, using the one or more processors, the store operation in a buffer for a designated number of lines of the video data based on the plurality of store parameters; and
implementing, using the one or more processors, the fetch operation from the buffer for the designated number of lines of the video data based on the plurality of fetch parameters.

2. The method of claim 1, wherein the fetch stop line is determined to be the same as the currently active store line.

3. The method of claim 1, wherein the fetch stop line is determined to have a designated offset from the currently active store line.

4. The method of claim 1, wherein the plurality of store parameters and the plurality of fetch parameters comprise index numbers identifying buffer lines of a ring buffer.

5. The method of claim 4, wherein the store stop line is determined based on a size of the buffer.

6. The method of claim 1, wherein the video data is received from a graphics processing unit, and wherein the store operation is associated with the graphics processing unit.

7. The method of claim 6, wherein the fetch operation is associated with a target display device.

8. The method of claim 1, wherein a size of the buffer is smaller than a size of the at least one video frame.

9. The method of claim 1, wherein a number of lines included in the buffer is configurable and is determined based on a user-input.

10. A device comprising:
a buffer configured to store a designated number of lines of a video frame included in video data; and
a controller comprising one or more processors configured to:
  determine a plurality of store parameters associated with a store operation and a plurality of fetch parameters associated with a fetch operation for the designated number of lines, wherein the plurality of store parameters identify a currently active store line and a store stop line defining when a store unit of a source stream should be stalled, wherein the plurality of fetch parameters identify a currently active fetch line and a fetch stop line defining when the fetch unit of a display stream should be stalled, wherein the stop lines define bounds of the store operation and the fetch operation to ensure synchronization between a source stream and a display stream, and wherein the fetch stop line is determined based on the currently active store line;
  implement the store operation in the buffer for at least some of the designated number of lines based on the plurality of store parameters; and
  implement the fetch operation from the buffer for at least some of the designated number of lines based on the plurality of fetch parameters.

11. The device of claim 10, wherein the fetch stop line is determined to be the same as the currently active store line.

12. The device of claim 11, wherein the store stop line is determined based on a size of the buffer.

13. The device of claim 10, wherein the video data is received from a graphics processing unit, wherein the store operation is associated with the graphics processing unit, and wherein the fetch operation is associated with a target display device.

14. The device of claim 10, wherein a size of the buffer is smaller than a size of the video frame.

15. A system comprising:
a host processor and memory configured to execute a software application and a graphics driver;
a buffer configured to store a designated number of lines of a video frame included in video data;
a controller configured to
  determine a plurality of store parameters associated with a store operation and a plurality of fetch parameters associated with a fetch operation for the designated number of lines, wherein the plurality of store parameters identify a currently active store line and a store stop line defining when a store unit of a source stream should be stalled, wherein the plurality of fetch parameters identify a currently active fetch line and a fetch stop line defining when the fetch unit of a display stream should be stalled, wherein the stop lines define bounds of the store operation and the fetch operation to ensure synchronization between a source stream and a display stream, and wherein the fetch stop line is determined based on the currently active store line;
  implement the store operation in the buffer for at least some of the designated number of lines based on the plurality of store parameters; and
  implement the fetch operation from the buffer for at least some of the designated number of lines based on the plurality of fetch parameters;
a display device configured to display a result of the fetch operation.

16. The system of claim 15, wherein the fetch stop line is determined to be the same as the currently active store line.

17. The system of claim 16, wherein the store stop line is determined based on a size of the buffer.

18. The system of claim 15, wherein the video data is received from a graphics processing unit, wherein the store operation is associated with the graphics processing unit, and wherein the fetch operation is associated with a target display device.

19. The system of claim 18, wherein the buffer is coupled between the graphics processing unit and the display device.

20. The system of claim 15, wherein a size of the buffer is smaller than a size of the video frame.

\* \* \* \* \*